Jan. 3, 1967          C. C. BAGWELL          3,295,603
METHOD AND APPARATUS FOR PRODUCTION WELL COMPLETION
Filed April 30, 1964
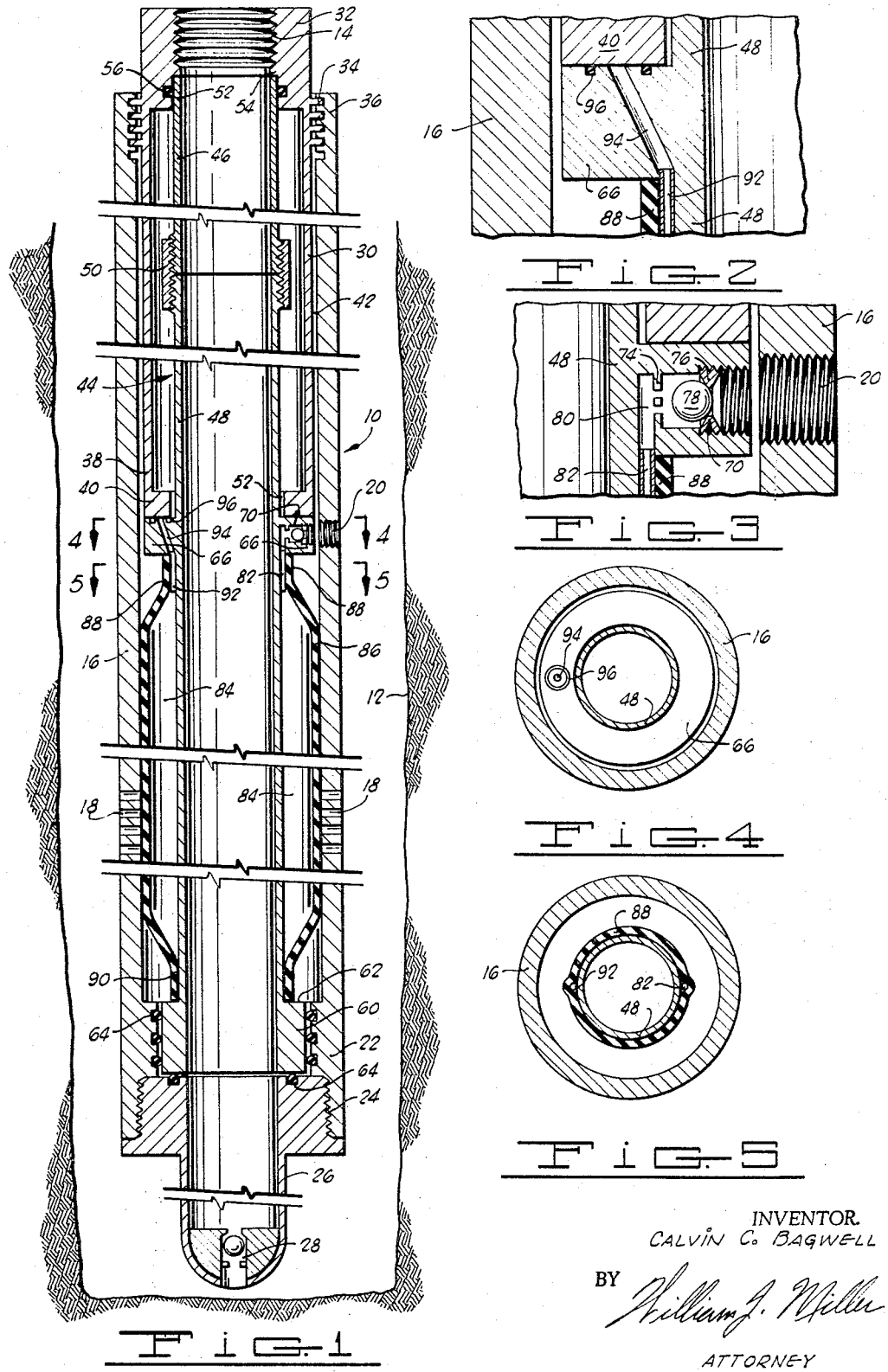
INVENTOR.
CALVIN C. BAGWELL
BY
ATTORNEY United States Patent Office 3,295,603
Patented Jan. 3, 1967

3,295,603
METHOD AND APPARATUS FOR PRODUCTION WELL COMPLETION
Calvin C. Bagwell, Abilene, Tex., assignor to Continental Oil Company, Ponca City, Okla., a corporation of Delaware
Filed Apr. 30, 1964, Ser. No. 363,729
17 Claims. (Cl. 166—12)

This invention relates generally to devices and techniques used in treating well bores to facilitate the production of subterranean minerals. More particularly, the present invention relates to a method and apparatus for placing a permeable filter media in the annulus which surrounds perforated tubular members placed in the bore hole of oil, gas or water wells.

The problems posed by sloughing shale and unconsolidated sand formations, and the resulting production of sand along with oil and gas are well known in the technology of petroleum production. A sloughing formation may eventually plug the well and require extensive and extremely expensive clean-out operations. Sand being produced may plug the well, but generally this type of granular material tends to cause malfunction in well pumps or other equipment used to produce the well.

It has heretofore been proposed to obviate or substantially reduce the problems associated with unconsolidated oil sands and sloughing shale formations by placing a perforated liner or tubular member in the well bore adjacent such formations. A suitable permeable material, such as permeable cement, is then pumped into the annulus between the perforated liner and the walls of the well bore. When the permeable cement has set up, the oil or gas may be produced without substantial interference being offered by the entry of sand into the pumping equipment, or by plugging of the well by a sloughing formation. In other instances, gravel has been pumped through the lower end of the perforated liner or screen and displaced to a position in the annulus between the screen and the wall of the well. This technique, termed "gravel packing," serves to filter sand and other particulate material from the oil prior to its passage through the perforations of the screen and into the production tubing.

One of the problems which has persisted in the described techniques of producing fluids from unconsolidated formations has been that of preventing the perforations in the metallic sleeve or liner which is positioned opposite the producing formation from becoming plugged or obstructed by the cement or gravel during the procedure of packing the annulus around the sleeve with a permeable filter material. Plugging of these perforations or apertures has the effect, of course, of preventing the free flow of production fluids into the production tubing and, to varying degrees, defeats the purpose of the employment of the perforated liner and the permeable material which is positioned between the liner and the formation.

There is also the related problem of preventing the cement or other pumpable filter media from flowing through the liner perforations back into the interior of the cementing tool before the media has set up or become fixed in position. Finally, when mud or water is used to displace the cement or gravel from the interior of the tool to the annulus which is to be packed with the filter media, it is desirable that the mud or water be prevented from passing through the perforations of the liner into the annulus and there mingling with the filter media prior to the time it has set up.

The present invention comprises a novel method and apparatus for producing fluids from unconsolidated subterranean formations. In general, the tool and technique involve the use of a perforated liner of the general type heretofore employed with means being provided for blocking the perforations in the liner until the filter material, such as porous cement or gravel, has had a chance to set up or become fixed in its position in the annulus between the liner and the well bore. More specifically, the present invention comprises a perforated liner or sleeve which is adapted to be attached to the lower end of, or at other location in, a work string; a flexible member which may be positioned across the perforations or openings in the liner on the inner side thereof to prevent flow of the porous filter media into the perforations; and means for automatically shifting the flexible member from its blocking position across the perforations after the porous filter media has set up in its permanent position, and it is desired to produce fluids from the subterranean formation adjacent the liner. The flexible member is preferably hydraulically or pneumatically positioned across the perforations in the liner to block fluid flow through the perforations, and is removed from its blocking position when it is desired to produce the well by automatically releasing the hydraulic or pneumatic pressure which retains it in its blocking position.

The method or technique which is employed in utilizing the novel cementing tool of the invention may be broadly described as (a) packing the perforations in the well screen or liner with a material which may be easily removed from the perforations by the forces and chemical characteristics inherent in the liquid or fluid which is to be produced by the well, (b) providing lateral support against such removal by internally blocking the openings of the perforations into the production tubing, (c) placing the liner as thus made up in the well bore adjacent the producing formation, (d) injecting a fluent filter media via the lower end of the liner into the annulus between the perforated liner and the producing formation, and then (e) automatically opening the previously blocked perforations in the liner to permit fluid from the formation to flow via the perforations into the production tubing.

From the foregoing brief general description of the invention, it will have become apparent that it is a major object of this invention to provide a device and technique for improving the efficiency with which fluids may be produced from unconsolidated subterranean formations.

More specifically, it is an object of the present invention to provide apparatus with which a porous filter media may be more easily located in the annulus between a perforated screen or liner and an unconsolidated formation from which it is desired to produce oil, gas, water or the like.

Another object of the present invention is to produce a well cementing tool which permits porous cement to be more effectively positioned between a perforated well screen or liner and a subterranean formation from which fluids are to be produced.

Yet another object of the present invention is to provide a method for preventing the perforations or apertures in a well screen or liner from becoming plugged by cement or other porous filter medium, which medium is positioned, while in a pumpable state, between the liner and a subterranean formation from which fluids are to be produced.

An additional object of the present invention is to provide an improved method for producing oil, gas, water and similar fluids from an unconsolidated underground formation with a minimum of difficulty being experienced as a result of problems stemming from the lack of consolidation in the formation.

Another object of the present invention is to provide a well cementing tool which is relatively simple in construction, yet is rugged and characterized by a long and trouble-free operating life.

A further object of the invention is to provide a well cementing tool which is partially automatic in its operation and may be easily prepared for use and operated by personnel having no special technical training.

In addition to the foregoing described objects and advantages, additional objects and advantages of the invention will become apparent as the following detailed disclosure of the invention is read in conjunction with a perusal of the accompanying drawings which illustrate the invention.

In the drawings:

FIGURE 1 is a vertical sectional view through the center of the cementing tool used in practicing the method of the present invention.

FIGURE 2 is an enlarged sectional view through a portion of the cementing tool showing details of construction of the pressure escape port used in the invention.

FIGURE 3 is an enlarged sectional view of a portion of the cementing tool of the invention showing details of the construction of the injection port used in the tool.

FIGURE 4 is a view in section taken along line 4—4 of FIGURE 1.

FIGURE 5 is a view in section taken along line 5—5 of FIGURE 1.

Referring now to the drawings in detail, and particularly, to FIGURE 1, one embodiment of the invention is designated generally by reference character 10 and is illustrated as it is placed in an uncased bore hole 12 of an oil or gas well. The formation adjacent the apparatus may be assumed to be an unconsolidated formation from which it is desired to produce oil or gas through a string of production tubing according to customary practices. The apparatus 10 of the present invention is coupled to the lower end of the work string of production tubing (not shown) by internal threads 14 located at the upper end of the apparatus.

The apparatus 10, which, for convenience of expression, will be hereinafter referred to as a cementing tool, comprises an outer pipe 16 which is slotted or perforated intermediate its ends with a plurality of perforations 18. The perforations 18 are spaced axially in, and circumferentially around, the outer pipe 16 in a manner well understood in the art. The outer pipe 16 is further provided with a threaded port 20 which extends radially through the wall of the outer pipe 16 and is spaced a substantial vertical distance above the perforations 18. At its lower end 22, the outer pipe 16 is provided with a plurality of internal threads 24 for threadedly engaging a check valve means which, in the illustrated embodiment, takes the form of a cement float shoe 26. The cement float shoe 26 is standard equipment which is commercially available and is provided with a suitable latch-in plug or a check valve 28 as illustrated in FIGURE 1. The check valve 28 functions to prevent a back flow of cement or other material forced through the float shoe 26 and check valve 28 and up into the annulus between the outer pipe 16 and the walls of the bore hole 12.

An inner liner sleeve 30 having, at the upper end thereof, a counterbored head 32 which carries the internal threads 14, is provided at a point adjacent its upper end with external left-hand threads 34 which engage internal left-hand threads formed at the upper end 36 of the outer pipe 16. Adjacent its lower end 38, the inner liner sleeve 30 is provided with a jarring lug 40 which, in the illustrated embodiment of the invention, assumes the form of a radially inwardly extending circumferential flange. In referring to FIGURE 1, it will be noted that a small annular space 42 exists between the inner liner sleeve 30 and the outer pipe 16 by virtue of the difference in the external and internal diameters, respectively, of these elements. It will also be noted that the length of the inner liner sleeve 30 is such that the jarring lug 40 is positioned just above the pressure injection port 20 of the outer pipe 16 when the inner liner sleeve 30 is threadedly engaged with the outer pipe.

Positioned within the inner liner sleeve 30 is an inner liner designated generally by reference character 44. The inner liner 44 is preferably made in an upper section 46 and a lower section 48 which are joined to each other by a threaded fitting which forms a collar jar lug 50. The collar jar lug 50 is characterized by a radial thickness which is greater than the radial dimension of a small annular space 52 which exists between the jarring lug 40 and the external wall of the lower section 48 of the inner liner 44. The purpose of this arangement will be subsequently described.

At its upper end, the upper section 46 of the inner liner 44 abuts against a radially inwardly extending annular shoulder 54 formed in the upper end 32 of the inner liner sleeve 30. An O-ring seal 56 or other suitable sealing member provides a fluid tight seal between the inner liner 44 and the head 32 of the inner liner sleeve 30.

The lower section 48 of the inner liner 44 is provided with a radially outwardly extending, annular flange 60 which has an upwardly facing shoulder 62 at the upper end thereof. A plurality of O-rings 64 are positioned in grooves formed in the lower end 22 of the outer pipe 16 and seal against the flange 60 when the inner liner 44 is placed in the operative position shown in FIGURE 1.

Spaced upwardly on the inner liner 44 a substantial distance above the annular flange 60 located at the lower end thereof, a radially outwardly extending, annular flange 66 is formed on the inner liner and forms a lug which abuts the lower side of the jarring lug 40. The lug 66 is disposed in vertical alignment with the port 20, and is provided with an internally threaded, radial passageway 70 at the side thereof adjacent the port 20. The inner end of the radial passageway 70 contains an apertured spider 74 and a valve seat 76 which cooperate with a ball member 78 to provide a check valve functioning to permit fluid flow radially inwardly in the radial passageway 70, but preventing retrograde flow in a radially outwardly direction therethrough.

The radial passageway 70 communicates at its inner end with a passageway 80 which extends axially with respect to the inner liner 44 and which communicates with a small, axially extending conduit 82.

As shown in FIGURE 5, the axially extending conduit 82 extends along the outer wall of the lower section 48 of the inner liner 44 and forms an inlet to a space 84 defined between the inner liner 44 and a flexible, fluid-retaining member 86. The flexible, fluid-retaining member 86 is preferably resilient and generally cylindrical in shape with its upper end 88 and lower end 90 bonded to the outer wall of the lower section 48 of the inner liner 44. The upper end 88 of the flexible, fluid-retaining member 86 is bonded around the axially extending conduit 82 with a fluid tight seal so that a fluid under compression in the space 84 will not be permitted to escape by leakage around the axially extending conduit. On the opposite side of the lower section 48 of the inner liner 44 from the axially extending conduit 82, a second axially extending conduit is provided and is designated by reference character 92. The axially extending conduit 92 communicates with an exhaust port 94 in the annular lug 66, and the flexible, fluid-retaining member 86 is bonded tightly therearound to prevent leakage of the fluid from the space 84.

Instead of constructing the invention in the manner illustrated in the drawing, the introduction and release of fluid from the space 84 may be facilitated by forming grooves in the wall of the lower section 48 of the inner liner 44, rather than by providing the axially extending conduits 82 and 92. The grooves so provided will, of course, communicate with the radially extending passageway 70 and with the exhaust port 94 so as to permit the fluid to be introduced to, and released from the space 84, in a manner hereinafter described.

The exhaust port 94 which extends through the lug 66 is closed during the cementing operation later described herein by an O-ring 96 or other suitable sealing member which surrounds the upper end of the port 94, and which seals against the underside of the jarring lug 40. This construction is best illustrated in FIGURES 2 and 4.

*Operation*

The well cementing tool of the invention is made up as shown in FIGURE 1 at the surface of the ground. To assemble the tool in the illustrated arrangement, the inner liner 44 is first positioned in the inner liner sleeve 30. The outer pipe 16 is then threaded onto the inner liner sleeve 30 using the left-hand threads 34, and using the O-rings 64 to establish a fluid tight seal between the annular flange 60 of the inner liner 44 and the lower end 22 of the outer pipe 16. The cement float shoe 26 is then threaded into the lower end of the outer pipe 16, and is also sealed against the annular flange 60 using an O-ring 64.

After the tool has been assembled, the flexible, fluid-retaining member 86 is distended or inflated by first threading a suitable, externally threaded nipple (not shown) through the port 20 in the outer pipe 16. The nipple also carries external threads which permit it to be screwed into the radially extending passageway 70. An inflating fluid which is preferably a liquid is then injected via the nipple into the annular space 84 between the flexible, fluid-retaining member 86 and the lower section 48 of the inner liner 44. Injection of the inflating fluid into the space 84 is continued until the flexible, fluid-retaining member 86 is expanded to a position in which its outer surface presses against the inner wall of the outer pipe 16 and covers the perforations 18. The injection nipple is then removed from the port 20 and passageway 70 and the check valve prevents the escape by this route of fluid from the space 84. The escape of fluid from the space 84 is also prevented at this time by the sealing of the upper end of the escape port 94 by the O-ring 96 and jarring lug 40.

A threaded plug is next screwed into the pressure injection port 20 to prevent formation materials or the permeable cement or other filter media from entering the outer pipe 16 via the port 20. Also, heavy grease or a similar temporary plugging material is packed in the perforations in the outer pipe 16 in order to prevent plugging of the perforations by the cement slurry at a later time during the operation of the tool.

The assembled tool 10 is mounted on the work string of production tubing and is lowered downhole. The tool 10 is positioned so that the perforated section of the outer pipe 16 is opposite the producing formation. Conventional cementing procedures can then be followed to displace the cement slurry down the work string, out through the cement float shoe 26 and up into the annular space between the well bore and the outer pipe 16. The slurry is given a sufficient time to set up and harden.

In order to retrieve the inner liner 44, the inner liner sleeve 30 and the flexible, fluid-retaining member 86 from the outer pipe 16, the tubing string is first rotated to the right. This movement serves to unscrew the left-hand threads 34 to detach the inner liner sleeve 30 from the outer pipe 16, but does not unscrew the conventional right-hand threads by which the liner sleeve 30 is attached to the tubing string. As the left-hand threads 34 are unscrewed, the jarring lug 40 moves upwardly from the annular lug 66 so as to permit the fluid retained in the space 84 between the flexible, fluid-retaining member 86 and the inner liner 44 to be discharged through the exhaust port 94. Pressure acting outwardly on the flexible, fluid-retaining member 86 is thus released and this member is permitted to collapse. The inner liner 44, inner liner sleeve 30 and flexible, fluid-retaining member 86 are now free to be pulled out of the well bore as the tubing string is raised in the well.

In most instances, the frictional engagement between the inner liner 44 and the lower end 22 of the outer casing 16 resulting from the use of the O-rings 64 may cause the inner liner 44 to be retained in the outer pipe 16 and detached from frictional engagement with the inner liner sleeve 30. In this event, the inner liner 44 can be released from the outer pipe 16 by imparting a jarring impact thereto by reciprocating the tubing string a sufficient distance to cause the jarring lug 40 to strike the collar jar lug 50 which is used to couple the lower section 48 of the inner liner 44 to the upper section 46 thereof.

It will be noted that at the time the flexible, fluid-retaining member 86 is collapsed by discharge of the fluid acting thereon through the exhaust port 94, no lateral support will be provided for the grease which has been packed in the perforations 18. Thus, at this time, the fluid to be produced can displace the grease into the interior of the outer pipe 16, and, through the combined influences of solvency and mechanical pressure, free the perforations 18 from obstruction. The fluid to be produced by the well is then free to flow into the outer pipe 16 and ultimately into the tubing string which may be reconnected to the outer pipe 16 after the inner liner 44 and inner liner sleeve 30 have been removed therefrom and pulled out of the well.

It will be apparent from the foregoing description that the present invention provides an oil well cementing technique and tool which permit a fluid to be more efficiently produced from unconsolidated formations. The tool may be used to position a pre-perforated liner or pipe section opposite an unconsolidated producing formation by a cementing procedure which does not result in plugging of the perforations in the liner.

Although it is quite apparent that the embodiment of the tool hereinbefore described may be modified structurally in several respects without affecting its operation, and that the steps of the method of the invention may be slightly altered in their sequence, it is equally apparent that changes and innovations of this type do not entail a departure from the basic concepts which underlie the invention. It is therefore intended that all changes and innovations of this character which do not alter the basic concepts of the invention shall be considered as circumscribed by the spirit and scope of the invention except as the same may be necessarily limited by the appended claims or reasonable equivalents thereof.

What is claimed is:
1. A well cementing tool comprising:
a perforated pipe;
a cement float shoe secured to one end of said perforated pipe; and
means for temporarily blocking said perforations removably positioned in said pipe, said means including:
    a flexible, fluid-retaining member positioned in said pipe for distention by fluid pressure into a blocking position over said perforations;
    threaded tubular means for detachably connecting said perforated pipe to a tubing string, said threaded tubular means having bidirectional threads thereon in two locations for unscrewing said threaded tubular means from said perforated pipe without unscrewing said threaded tubular means from a tubing string to which it is connected;
    means for exerting a distending fluid pressure on said flexible, fluid-retaining member; and means associated with said threaded tubular means for releasing said distending fluid pressure when said threaded tubular means is rotated about its axis.

2. A well cementing tool as claimed in claim 1 wherein said means for temporarily blocking the perforations in said pipe is further characterized to include:
an inner liner having an upper end, and a lower end in juxtaposition to said cement shoe, said inner liner extending through said threaded tubular means from one end thereof to the other for placing a tubing string to which said threaded tubular means is attached in direct communication with said cement shoe, and said inner liner further having a lower end portion defining an annulus with said perforated pipe and supporting said flexible, fluid-retaining member in said annulus in radial alignment with the perforations in said pipe.

3. A well cementing tool comprising:
a tubular well screen adapted for connection at one of its ends to a tubing string and perforated intermediate its length;
flexible, fluid-retaining means removably secured in said well screen and distensible by fluid pressure to cover and block at least a portion of said perforations; and
threaded tubular means for detachably connecting said screen to a tubing string, said threaded tubular means having bidirectional threads thereon in two locations for unscrewing said threaded tubular means from the screen without unscrewing said threaded tubular means from a tubing string to which it is connected;
means for exerting a distending fluid pressure on said flexible, fluid-retaining member; and
means associated with said threaded tubular means for releasing said pressure when the tubular means is rotated about its axis.

4. A well cementing tool as claimed in claim 3 and further characterized to include check valve means in the end of said tubular screen opposite its end connectable to said tubing string for permitting cement to be ejected from said screen and preventing flow of the cement into said screen through said check valve means.

5. A well cementing tool as claimed in claim 3 wherein said flexible, fluid-retaining means comprises:
a rigid tubular member coaxially positioned in and defining an annulus with said tubular well screen, said annulus communicating with the perforations in said well screen;
a flexible, fluid-retaining member around said rigid tubular member and distensible by fluid pressure into abutting contact with said tubular screen into a position to cover and block a portion of the perforations;
fluid passageway means for introducing a fluid between said rigid tubular member and said flexible, fluid-retaining member; and
means for releasing fluid from between said rigid tubular member and said flexible, fluid-retaining member.

6. A tool useful for producing fluids from an unconsolidated subterranean formation comprising:
a tubular well screen having an upper end and a lower end and perforated intermediate its length;
check valve means connected to the lower end of said tubular well screen;
a tubular inner liner sleeve extending into the upper end of said tubular well screen and threadedly connected at a point intermediate its length to the upper end of said tubular well screen, said tubular inner liner sleeve having an upper end defining a counterbore of smaller diameter than the main bore of said tubular inner liner sleeve, and having a lower end positioned inside said tubular well screen and intermediate the length thereof;
a tubular inner liner coaxially positioned in said inner liner sleeve and defining a first annulus therewith, said inner liner having an upper end sealingly inserted in the counterbore of the upper end of said inner liner sleeve, and having a lower portion extending below the lower end of said inner liner sleeve and defining with said tubular well screen a second annulus communicating with the perforations in said well screen;
a flexible, generally tubular, fluid-retaining member positioned around said tubular inner liner in the second annulus and sealed at its opposite ends to said tubular inner liner;
means for interjecting a fluid between said inner liner and said flexible, fluid-retaining member whereby said flexible, fluid-retaining member may be distended to cover the perforations in said well screen; and
means for releasing a fluid from between said inner liner and said flexible, fluid-retaining member.

7. A tool as claimed in claim 6 wherein the lower end of said tubular inner liner is sealingly engaged with the lower end of said well screen, and the bore of said inner liner communicates with said check valve means whereby a fluent material may be passed through said tubular inner liner and through the check valve means at the lower end of said tool.

8. A tool as claimed in claim 6 wherein said means for releasing a fluid from between said inner liner and said flexible, fluid-retaining member comprises:
a conduit extending between the flexible, fluid-retaining member and said tubular inner liner; and
means on the lower end of said inner liner sleeve positioned to alternately open and close said conduit when said inner liner sleeve is rotated relative to said inner liner.

9. A tool as claimed in claim 8 wherein said means on the lower end of said inner liner sleeve positioned to open and close said conduit comprises a lug extending radially inwardly into said first annulus; and
wherein said tool is further characterized to include an annular lug secured around said inner liner and projecting radially outwardly therefrom into said first annulus for cooperating with said lug on the lower end of said inner liner sleeve to remove said inner liner from said well screen when said inner liner sleeve is removed from said well screen.

10. A tool as claimed in claim 6 wherein said means for fluid interjection comprises threaded passageway means extending through said well screen and between said fluid-retaining member and said inner liner for threadedly receiving a threaded nipple connected to a supply of fluid under pressure.

11. A method for positioning perforated liner in a well bore opposite a formation bearing a fluid which it is desired to produce, said method comprising:
blocking the perforations in said liner by covering said perforations with a flexible member;
lowering said liner at the end of a tubing string with the perforations thus blocked into the well bore to a position opposite said producing formation while maintaining said member in blocking position by fluid pressure;
injecting a settable permeable filter media via the lower end of the liner into the annulus between the perforated liner and said formation; and then, after the filter media has set up to a hardened state,
rotating said tubing string to release said liner and simultaneously release the fluid pressure on said member to permit said perforations to pass the fluid which it is desired to produce.

12. A well cementing tool comprising:
a tubular well screen adapted for connection at one of its ends to a tubing string and perforated intermediate its length, said screen being detachably connected at said one end to the tubular sleeve hereinafter defined;

flexible, fluid-retaining means removably secured in said well screen and distensible by fluid pressure to cover and block at least a portion of said perforations;

a tubular sleeve connected at one of its ends to a well tubing string and extending coaxially into said tubular well screen, said sleeve having a radially inwardly projecting jarring lug formation formed thereon and cooperating with said flexible, fluid-retaining means to remove said fluid-retaining means from said well screen when said sleeve is disconnected from the screen and removed therefrom.

13. A well cementing device as claimed in claim 12 wherein said flexible, fluid-retaining means comprises:
a resilient, generally tubular sleeve;
means inside said resilient, generally tubular sleeve defining a fluid chamber with said sleeve;
a first conduit for introducing fluid to said fluid chamber;
a second conduit for releasing fluid from said fluid chamber; and
wherein said jarring lug seals said second conduit when positioned in a first position, and is rotatable with a tubing string to a second position in which said second conduit is opened to release said fluid from said fluid chamber.

14. A well cementing tool comprising:
a tubular well screen adapted for connection at one of its ends to a tubing string and perforated intermediate its length; and
flexible, fluid-retaining means removably secured in said well screen and distensible by fluid pressure to cover and block at least a portion of said perforations, said fluid retaining means comprising:
   a rigid tubular member coaxially positioned in and defining an annulus with said tubular well screen, said annulus communicating with the perforations in said well screen;
   a flexible, fluid-retaining member around said rigid tubular member and distensible by fluid pressure into abutting contact with said tubular screen into a position to cover and block a portion of the perforation;
   fluid passageway means for introducing a fluid between said rigid tubular member and said flexible, fluid-retaining member, said passageway means comprising:
      a conduit extending between said flexible, fluid-retaining member and said rigid tubular member; and
      pressure injecting valve means communicating with said conduit and containing a check valve permitting fluid to flow through said port and between said rigid tubular member and said flexible, fluid-retaining member but preventing retrograde flow through said check valve; and
   means for releasing fluid from between said rigid tubular member and said flexible, fluid-retaining member.

15. A well cementing tool as claimed in claim 14 wherein one of said perforations is spaced axially along said screen toward said one end of said screen from the remainder of said perforations, and said pressure injection valve means is disposed horizontally opposite and in alignment with said one perforation.

16. A well cementing tool comprising:
a tubular well screen adapted for connection at one of its ends to a tubing string and perforated intermediate its length;
flexible, fluid-retaining means removably secured in said well screen and distensible by fluid pressure to cover and block at least a portion of said perforations, said fluid-retaining means comprising:
   a rigid tubular member coaxially positioned in and defining an annulus with said tubular well screen, said annulus communicating with the perforations in said well screen;
   a flexible, fluid-retaining member around said rigid tubular member and distensible by fluid pressure into abutting contact with said tubular screen into a position to cover and block a portion of the perforations;
   fluid passageway means for introducing a fluid between said rigid tubular member and said flexible, fluid-retaining member; and
   means for releasing fluid from between said rigid tubular member and said flexible, fluid-retaining member, said releasing means comprising:
      a conduit extending between said flexible, fluid-retaining member and said rigid tubular member; and
      pressure release valve means communicating with said conduit and adapted for connection to a tubing string for releasing fluid from said annulus when said tubing string is rotated.

17. A well cementing tool as claimed in claim 16 wherein said pressure release valve means comprises:
a rigid tubular sleeve around said rigid tubular member and partially inside said well screen, said tubular sleeve having means at one of its ends for connecting the sleeve to a tubing string, for rotation with said tubing string; and
means on the end of said sleeve opposite said connecting means for closing said conduit in one position of said tubular sleeve, and for opening said conduit when said tubular sleeve is rotated with said tubing string to a second position.

References Cited by the Examiner

UNITED STATES PATENTS

| | | | |
|---|---|---|---|
| 2,174,795 | 10/1939 | Layne | 166—34 |
| 2,224,630 | 12/1940 | Dean et al. | 166—25 |
| 2,288,557 | 6/1942 | Vollmer | 166—12 |
| 2,401,035 | 5/1946 | Akeyson et al. | 166—205 |
| 3,057,405 | 10/1962 | Mallinger | 166—25 |
| 3,216,497 | 11/1965 | Howard et al. | 166—19 |

CHARLES E. O'CONNELL, *Primary Examiner.*

S. J. NOVOSAD, *Assistant Examiner.*